US010389928B2

(12) United States Patent
Brown et al.

(10) Patent No.: US 10,389,928 B2
(45) Date of Patent: Aug. 20, 2019

(54) WEAPON FIRE DETECTION AND LOCALIZATION ALGORITHM FOR ELECTRO-OPTICAL SENSORS

(71) Applicant: United States of America, as represented by the Secretary of the Army, Fort Belvoir, VA (US)

(72) Inventors: Jeremy B. Brown, Alexandria, VA (US); John E. Hutchison, III, Alexandria, VA (US); Jami H. Davis, Alexandria, VA (US); Joshua K. Gabonia, Woodbridge, VA (US)

(73) Assignee: UNITED STATES OF AMERICA, AS REPRESENTED BY THE SECRETARY OF THE ARMY, Pentagon, Washington, DC (US)

( * ) Notice: Subject to any disclaimer, the term of this patent is extended or adjusted under 35 U.S.C. 154(b) by 340 days.

(21) Appl. No.: 15/234,184

(22) Filed: Aug. 11, 2016

(65) Prior Publication Data

US 2018/0047144 A1 Feb. 15, 2018

(51) Int. Cl.
*G06T 7/00* (2017.01)
*H04N 5/225* (2006.01)
*H04N 5/33* (2006.01)
*F41H 13/00* (2006.01)
*G01S 11/12* (2006.01)
*G01S 3/78* (2006.01)
(Continued)

(52) U.S. Cl.
CPC .......... *H04N 5/2258* (2013.01); *F41H 13/00* (2013.01); *G01S 3/78* (2013.01); *G01S 11/12* (2013.01); *G06K 9/00* (2013.01); *G06T 7/73* (2017.01); *H04N 5/33* (2013.01); *G06T 2207/10016* (2013.01); *G06T 2207/10048* (2013.01); *G06T 2207/30212* (2013.01)

(58) Field of Classification Search
CPC .......... H04N 5/2258; H04N 5/33; G06T 7/73; G06T 2207/30212; G06T 2207/10048; G06T 2207/10016; G01S 3/78; G01S 11/12; G06K 9/00; F41H 13/00
See application file for complete search history.

(56) References Cited

U.S. PATENT DOCUMENTS 5,731,996 A * 3/1998 Gilbert ................... G01V 3/081
324/207.13
5,838,242 A * 11/1998 Marsden ................ G08B 17/10
340/628
(Continued)

FOREIGN PATENT DOCUMENTS

WO 2007056753 A2 5/2007

OTHER PUBLICATIONS

Greenacre et al. "Multivariate Analysis of Ecological Data" Fundacion BBVA (Year: 2013).*

*Primary Examiner* — Gims S Philippe
*Assistant Examiner* — Stefan Gadomski
(74) *Attorney, Agent, or Firm* — Richard J. Kim

(57) ABSTRACT

A method is disclosed for detecting and locating a blast, including muzzle flash, created by the launch of a projectile from a gun barrel, rocket tube or similar device, generally associated with weapons fire. The method is used in conjunction with electro-optical imaging sensors and provides the azimuth and elevation from the detecting sensor to the launch location of the blast and also provides the weapon classification.

11 Claims, 5 Drawing Sheets

(51) Int. Cl.
*G06K 9/00* (2006.01)
*G06T 7/73* (2017.01)

(56) References Cited

U.S. PATENT DOCUMENTS

| | | | | |
|---|---|---|---|---|
| 6,496,593 | B1* | 12/2002 | Krone, Jr. | F41G 3/147 340/540 |
| 6,625,399 | B1* | 9/2003 | Davis | G01J 1/4214 396/263 |
| 6,825,792 | B1* | 11/2004 | Letovsky | F41H 13/00 250/251 |
| 7,256,401 | B2* | 8/2007 | Garmer | G01J 1/02 250/339.01 |
| 7,409,899 | B1* | 8/2008 | Beekman | F41G 3/147 89/1.11 |
| 7,586,812 | B2* | 9/2009 | Baxter | F41H 13/00 367/127 |
| 7,880,870 | B1* | 2/2011 | Ertem | B64D 17/383 244/3.14 |
| 8,421,015 | B1* | 4/2013 | Scott | F41G 3/147 250/338.4 |
| 8,577,120 | B1* | 11/2013 | Koshti | G06T 7/0004 250/341.8 |
| 8,809,787 | B2 | 8/2014 | Tidhar et al. | |
| 8,995,227 | B1 | 3/2015 | Johnson | |
| 9,103,714 | B2* | 8/2015 | Treado | G01J 3/02 |
| 9,196,041 | B2 | 11/2015 | Moraites et al. | |
| 9,704,058 | B2* | 7/2017 | Aphek | G06K 9/00771 |
| 9,759,601 | B2* | 9/2017 | Nemirovsky | G01J 1/4228 |
| 2002/0003470 | A1* | 1/2002 | Auerbach | F41H 11/00 340/425.5 |
| 2002/0196140 | A1* | 12/2002 | Streetman | G08B 29/186 340/523 |
| 2005/0254712 | A1* | 11/2005 | Lindeman | G06K 9/00 382/224 |
| 2006/0021498 | A1* | 2/2006 | Moroz | F41G 3/147 89/41.06 |
| 2007/0125951 | A1* | 6/2007 | Snider | G06K 9/00771 250/363.03 |
| 2008/0002192 | A1* | 1/2008 | David | G01S 3/783 356/141.5 |
| 2009/0087029 | A1* | 4/2009 | Coleman | G06K 9/00208 382/103 |
| 2010/0271905 | A1* | 10/2010 | Khan | G10L 25/48 367/124 |
| 2010/0278387 | A1* | 11/2010 | Agurok | F41H 13/00 382/103 |
| 2011/0170798 | A1* | 7/2011 | Tidhar | G01J 3/2803 382/276 |
| 2011/0271822 | A1* | 11/2011 | Myr | F41H 13/00 89/1.11 |
| 2012/0175418 | A1* | 7/2012 | Jones | F41H 11/02 235/414 |
| 2013/0099096 | A1* | 4/2013 | Hutchin | F41G 3/147 250/208.1 |
| 2013/0206901 | A1* | 8/2013 | Herman | F41G 3/147 244/1 R |
| 2014/0184806 | A1* | 7/2014 | Tidhar | G01J 3/2803 348/164 |
| 2015/0015869 | A1* | 1/2015 | Smith | G01S 17/023 356/28.5 |
| 2015/0109165 | A1* | 4/2015 | Holder | H04B 1/7097 342/159 |
| 2015/0219426 | A1* | 8/2015 | Moraites | G06T 7/70 89/1.11 |
| 2015/0242702 | A1* | 8/2015 | Aphek | G06K 9/00771 382/113 |
| 2016/0112655 | A1 | 4/2016 | Moraites et al. | |
| 2016/0178433 | A1* | 6/2016 | Aphek | G01J 1/4228 250/338.1 |

\* cited by examiner

WEAPON FIRE DETECTION AND LOCALIZATION ALGORITHM FOR ELECTRO-OPTICAL SENSORS

GOVERNMENT INTEREST

The invention described herein may be manufactured, used, sold, imported, and/or licensed by or for the Government of the United States of America.

FIELD OF THE INVENTION

The present invention relates to the field of image processing, and in particular, a method for detecting and locating a blast, including muzzle flash, created by the launch of a projectile from a gun barrel, rocket tube or similar device, generally associated with weapons fire.

STATEMENT REGARDING PRIOR DISCLOSURES BY THE CO-INVENTORS

A presentation co-authored by Jeremy Brown, Jami Davis, and Josh Gabonia (the co-inventors), entitled, "Clutter Mitigation for Ground Vehicle Hostile Fire Detection and Location (HFDL) Using EOIR Sensors," was submitted to the Military Sensing Symposia for a closed MSS Passive Sensors Parallel Symposium (Proceeding of MSS 2015), held September 2015.

BACKGROUND OF THE INVENTION

Weapon fire detection and localization can be accomplished using a variety of sensing modalities. Typical modalities include radar, acoustic, electro-optic, or some combination of these. Electro-optical solutions typically exploit projectile launch blast, thermal radiation of in-flight round, and the thermal radiation of rocket motors of missiles and rockets. Electro-optical solutions are often employed for close range small arms and unguided projectile detection. Additionally, air-systems have employed electro-optical sensors for long range weapons fire detection systems such as missile warning systems. For systems detecting weapons fired air-to-air or air-to-ground, atmospheric signal degradation is less impactful than for systems which detect ground-to-ground weapons fire. Long range electro-optical weapons fire detection systems for ground application must be able to handle complications due to atmospheric signal degradation and near field clutter sources.

Electro-optical weapons fire detection systems for ground application, capable of detecting short and long range threats require complex detection methodologies to accurately detect weapons fire over a broad dynamic range of signal intensity. When a high intensity weapon signature is available, as when the launch is near the sensor, simple thresholds can be used to detect weapon fire while minimizing clutter sources. Long range electro-optical weapons fire detections often involve severely reduced signature intensities due to atmospheric degradation. Additionally, near field motion can generate clutter sources of similar intensities to far field weapons fire. A complex detection algorithm is required to differentiate actual weapons fire signatures of various intensities from cluttered backgrounds while providing acceptable detection rates.

SUMMARY OF THE INVENTION

A detection method that operates on the output of an imaging detection sensor system based on one or more electro-optical imagers is presented here. The detection method is able to extract weapons fire signatures of high signal intensity in the near field, as well as very low intensity weapons fire signatures in the far field, with a high detection rate. The detection method minimizes false detections from clutter sources. The detection method discriminates weapons fire signatures from background by analyzing characteristics of the extracted signature. Features of the extracted signature are used to classify the detection as either weapons fire or false alarm, where weapon fire can be subdivided into general weapon classes, such as guided missiles (GM), recoilless rifle, and rocket. Weapon fire is not limited to these systems, but can include other sources such as small arms fire, as the system is intended to detect the a blast, including muzzle flash, created by the launch of a projectile from a gun barrel, rocket tube or similar device.

In one aspect, an exemplary system in which the weapon fire detection and localization would be used is disclosed. An exemplary system is comprised of a weapons fire detection imaging sensor system and a processor. As an example, the video output of an associated detection sensor is provided as an input to the processor. The processor hosts the weapons fire detection and localization algorithm.

In another aspect, an exemplary weapons fire detection and localization algorithm is disclosed. For each imaging detection sensor, the video output is provided to the processor. Weapon fire detections are determined from the independent video output of each imaging detection sensor in the weapon fire detection sensor system. When using multiple imaging detection sensors, a single weapons fire event may generate detections on multiple sensors. The detections across multiple sensors are then analyzed to determine if they were generated by a single hostile fire event. If the multiple detections are found to have been generated by a single hostile fire event, a single detection is created. Features from a potential detection are compared to profiles of a detection and used to classify the detection as either weapons fire or false alarm, where weapon fire can be subdivided into GM, RR, or rocket. Associated detections, which have been classified as weapon fire are declared as weapon fire. For each declared weapon fire event, the azimuth location, elevation location, weapon classification, and time of firing are reported.

Yet, in another aspect, a detailed description of an exemplary detection method used to distinguish weapon fire in the sensor output is disclosed. The video output from each imaging detection sensor is processed to determine if a detection occurred. For each imaging detection sensor, the output video frame is read by the processor and the frame is preprocessed to differentiate signal from background. Signal is tracked over time. Consistent signals are analyzed to determine the location of peak signal intensity and the signal is analyzed at the peak location to determine the time at which the signal starts and the time at which it stops. The signal is extracted between the measured start and stop times. Signal is also extracted from pixels surrounding the pixel in which the peak signal was found, using the measured start and stop times. The extracted signals are analyzed for duration and shape characteristics. These are compared against known target characteristics. If multiple signals are found to have characteristics corresponding to known targets, those signals are analyzed to determine whether they were generated by the same weapons fire event. For multiple signals generated by the same weapon fire event, a single detection is generated.

Finally, a detailed description of an exemplary classification methodology is disclosed. For each detection, features of the extracted signature are used to classify the detection as either weapons fire or false alarm. If the detection is classified as false alarm, the false alarm database is updated to reflect the recently determined false alarm. If the detection is classified as weapon fire, the detection is reclassified to determine the class of weapon of fire, where weapon fire can be classified as GM, RR, or rocket. The database containing known target signatures of the weapons fire class and the database of false alarms are analyzed to determine which features provide the greatest distinction between the two classes. The distinction, or distance, between the two classes, is called a distance metric. The features which provide the greatest distinction between the two classes are used to measure the distance between the detection and the weapons fire class. This calculated distance is compared to a threshold. If the distance threshold is exceeded, the detection is declared a false alarm, and the false alarm class is updated with the new false alarm. If the calculated distance is within the distance threshold, the detection is declared as weapon fire. The classifier, which is used to classify detections as either weapons fire or false alarm, is periodically updated using the known target classes and the current false alarm class.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
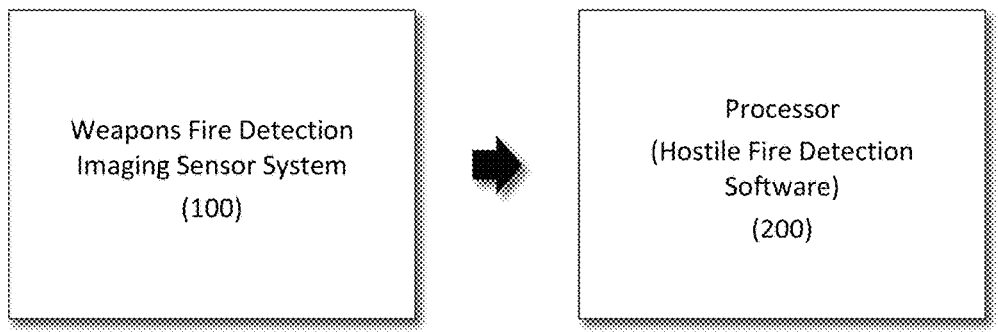
FIG. 1 shows an exemplary weapon fire detection and localization system based on a weapons fire detection imaging sensor system and a processor.

FIG. 1 shows an exemplary weapon fire detection and localization system based on a weapons fire detection imaging sensor system (100), and a processor (200). Specifically, one embodiment of the weapons fire detection imaging sensor system includes two imaging sensors. The two exemplary imaging sensors, both imaging in separate infrared bands, operate at a frame rate of greater than 60 Hz and have a focal plane array (FPA) size of at least 640 by 480. The video outputs of the associated detection sensors are provided as inputs to the processor. The processor hosts the weapons fire detection and localization algorithm.

Figure 2:
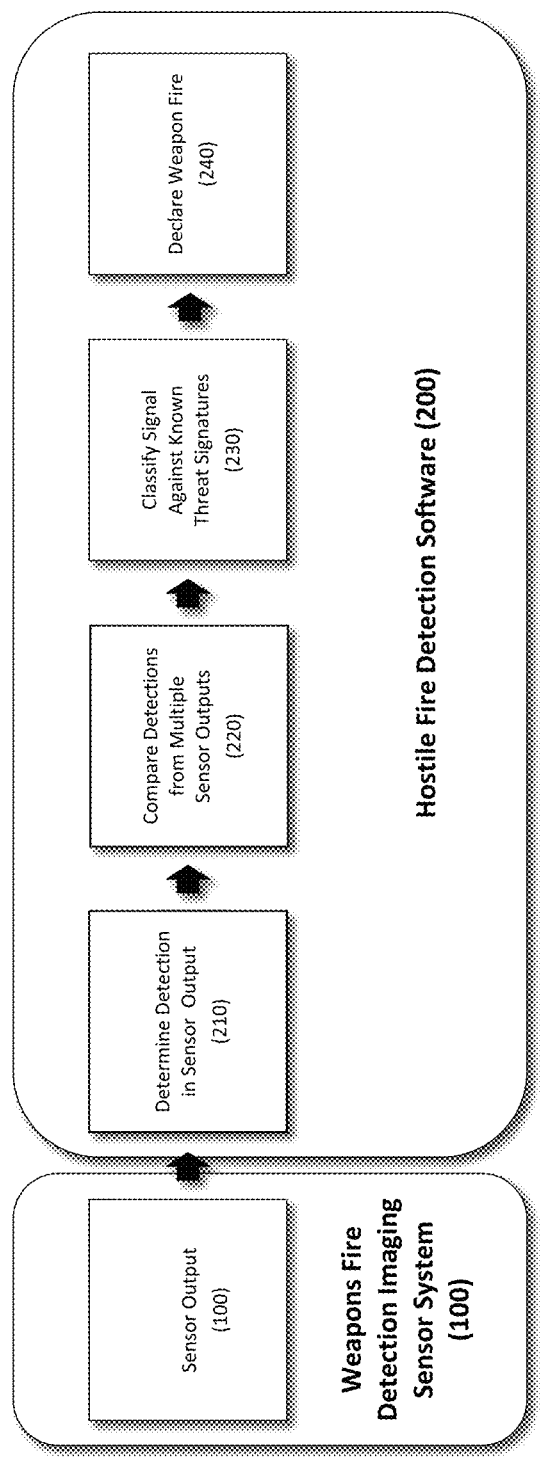
FIG. 2 show an exemplary weapons fire detection and localization algorithm, wherein for each imaging detection sensor, the video output is provided to the processor.

FIG. 2 describes an exemplary weapons fire detection and localization algorithm. For each imaging detection sensor (100), the video output is provided to the processor. Weapon fire detections are determined from the independent video output of each imaging detection sensor in the weapon fire detection sensor system (210). As an example, one embodiment of the weapons fire detection imaging sensor system includes two sensors operating in different infrared bands. The output of the primary sensor is processed for potential detections. Independently, the output of the secondary imaging sensor is processed to determine detections. When using multiple imaging detection sensors, a single weapons fire event may generate detections on multiple sensors.

The detections across multiple sensors are then analyzed to determine whether the multiple detections across multiple sensors were generated by a single hostile fire event. Detection locations, detection event time, and characteristics of detected signatures are used to determine whether multiple detections were generated by the same weapons fire event. If the multiple detections are found to have been generated by a single hostile fire event, a single detection is created (220). For example, in the previously mentioned example system, detections from the primary sensor are analyzed against detections from the secondary sensor to determine whether the detections were generated from the same weapons fire event. If the detections in the primary sensor and the detections in the secondary sensor were generated from the same weapons fire event, a single detection is generated to represent the associated detections, which contains signature information from both the primary detection and the secondary detection.

Features are calculated from the temporal and intensity profile of a detection and used to classify the detection as either weapons fire or false alarm, where weapon fire can be subdivided into GM, RR, or rocket (230). Associated detections, which have been classified as weapon fire are declared as weapon fire (240). For each declared weapon fire event, the azimuth location, elevation location, weapon classification, and time of firing are reported.

Figure 3:
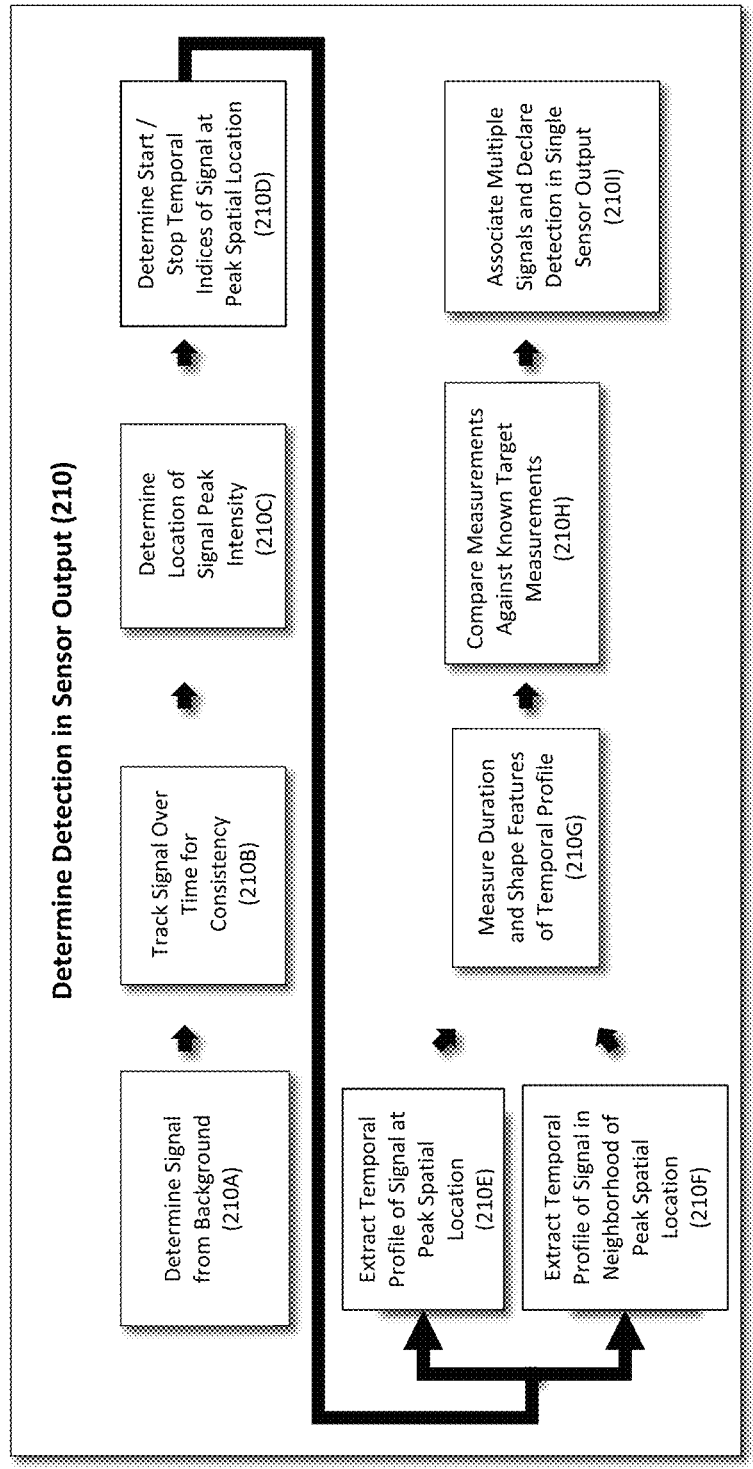
FIG. 3 provides a detailed description of an exemplary method used to distinguish weapon fire in the sensor output, wherein the video output from each imaging detection sensor is processed to determine if a detection occurred.

FIG. 3 provides a detailed description of the detection method used to determine weapon fire. The video output from each imaging detection sensor is processed to determine if a detection occurred. For each imaging detection sensor, the output video frame is read by the processor and the frame is preprocessed to differentiate signal from background (210A). The input image frame is filtered to minimize the effects of global scene motion. Signal which statistically deviates from the background is noted. Signal deviation from the background is tracked over time (210B).

Figure 5:
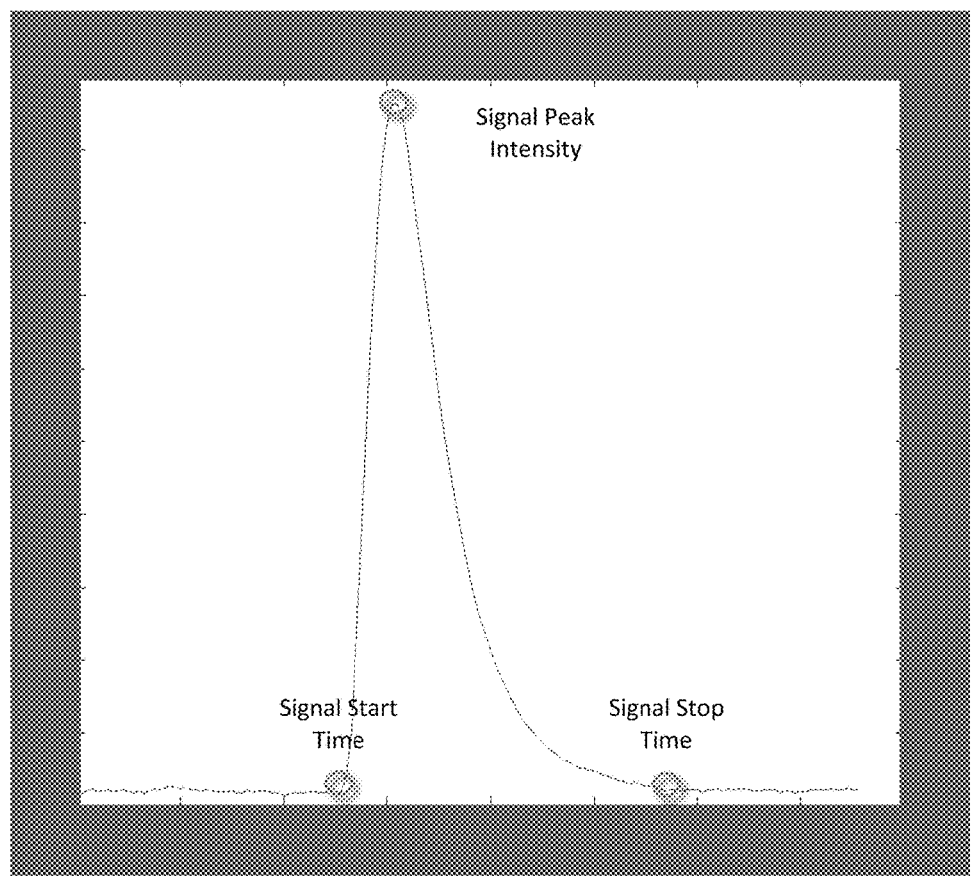
FIG. 5 shows an exemplary extracted weapons fire signal from the output of a weapons fire detection sensor, depicting an exemplary temporal-intensity signature profile, the signal peak intensity, the signal start time, and the signal stop time.

Consistent signals are analyzed to determine the location of peak signal intensity within a spatial-temporal region of pixels (210C). For this spatial region of pixels, a single peak intensity pixel is determined. The signal is analyzed at the peak location to determine the time at which it starts and stops (210D). The signal is extracted between the measured start and stop times (210E). Signal is also extracted from pixels surrounding the pixel in which the peak signal was found (210F). The extracted signals are analyzed for duration and shape characteristics (201G). These are compared against known target characteristics (210H). As an example, an extracted signal is shown depicting a temporal-intensity signature profile in FIG. 5. The extracted signal is labeled to show the peak signal intensity, signal start time, and signal stop time.

If multiple signals are found to have characteristics corresponding to known targets, those signals are analyzed to determine whether they were generated by the same weapons fire event. Spatial location, time of detection, and characteristics of the temporal-intensity signature profile are used to determine whether multiple detections were generated from a single weapons fire event. For multiple detections generated by a single weapon fire event, a single detection is retained and forwarded to the next algorithm stage (210I). As an example, consider an embodiment which consists of two infrared sensors. In this example, a weapons fire event generates multiple detections at various spatial pixel locations in the secondary imaging sensor output. These multiple detections are analyzed and compared to determine whether they were generated from the same weapons fire event. If they are determined to be associated, a single detection is maintained and the rest are discarded.

Figure 4:
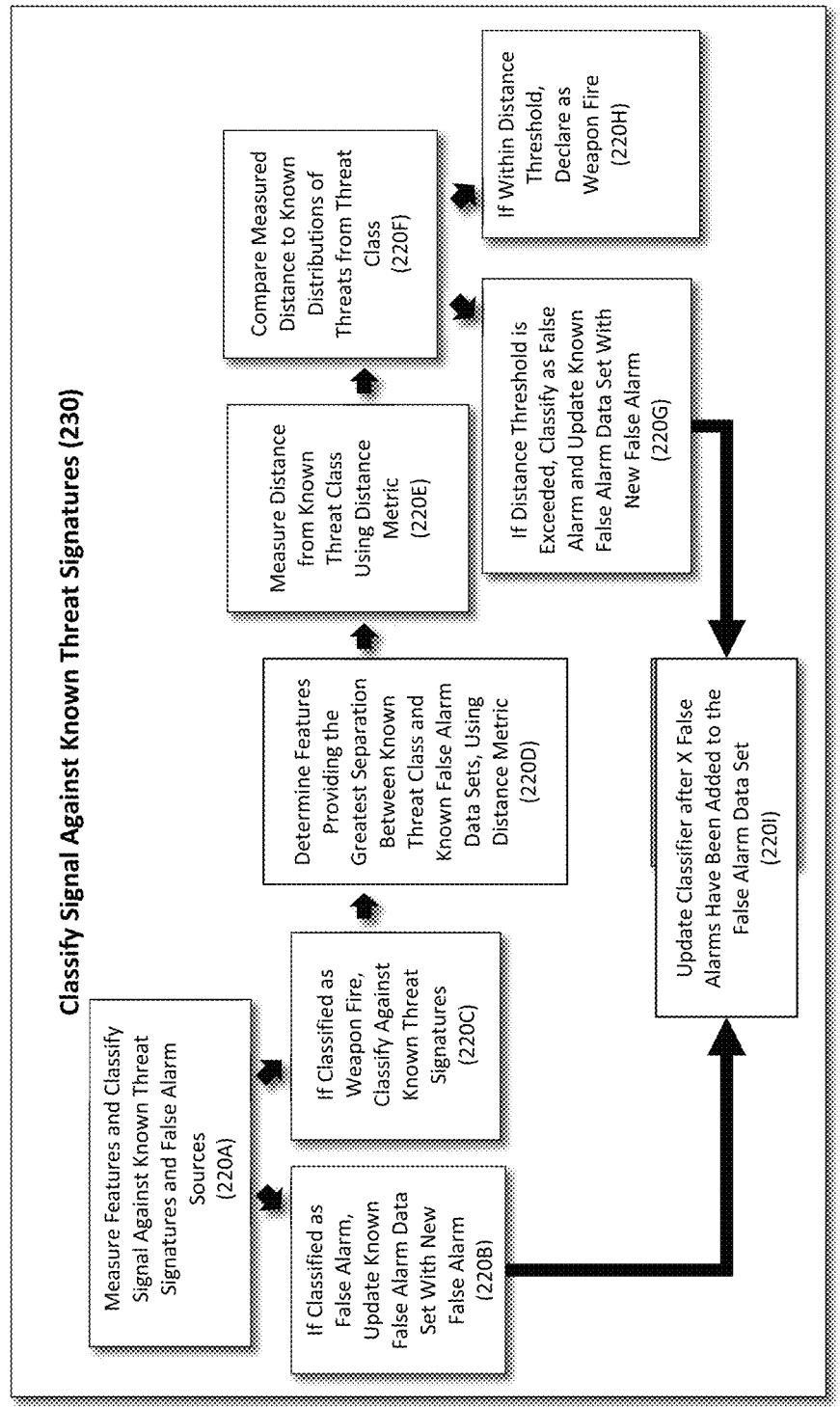
FIG. 4 provides a detailed description of an exemplary classification methodology.

FIG. 4 provides a detailed description of the classification methodology. For this methodology, a database of features from known target weapon fire signatures exists, where weapon fire can be subdivided into GM, RR, or rocket. Additionally, a database of features from known false alarms exists. For each detection, features of the extracted signature are used to classify the detection as either weapons fire or false alarm (220A). Features are determined from the spatial, temporal-intensity profile of the signal. If the detection is classified as false alarm, the false alarm database is updated to reflect the false alarm (220B). A percentage of the database is used to record the most recent false alarms to reflect false alarms generated from a changing environment. If the detection is classified as weapon fire, the detection is reclassified to determine the class of weapons fire, where weapons fire can be classified as GM, RR, or rocket (220C). The class containing known target signatures of weapons fire class and the false alarms class are analyzed to determine which features provide the greatest distinction between the two classes. The false alarm class is derived from the false alarm database. The distinction or distance between the two classes, is measured using a distance metric (220D). The feature distance is measured using the following formula, where $\mu_i$ and $\sigma_i$ are the mean and standard deviation value of a given feature for the $i^{th}$ class and abs is the absolute value:

$$\text{Feature Distance} = \frac{\text{abs}(\mu_1 - \mu_2)}{\sqrt{1/2(\sigma_1^2 + \sigma_2^2)}}.$$

The features which provide the greatest distinction between the two classes, are used to measure the distance between the detection and the class containing known target signatures of the weapons fire class (220E). The distance between the detection and the class is measured using the following formula, where n is the number of features used, $x_i$ is the value of the detected signal's $i^{th}$ feature, and $\mu_i$ and $\sigma_i$ are the mean and standard deviation value of the $i^{th}$ feature of the class:

$$\text{Detection Distance} = \sqrt{\sum_{i=1}^{n} \left(\frac{x_i - \mu_i}{\sigma_i}\right)^2}.$$

The calculated distance is compared to a threshold (220F). If the distance threshold is exceeded, the detection is declared as a false alarm, and the false alarm database is updated with the new false alarm (220G). If the calculated distance is within the distance threshold, the detection is declared as weapon fire (220H). The classifier, which is used to classify detections as either weapons fire or false alarm, is periodically updated using the known target databases and the current false alarm database. Thus the known target database and current false alarm database are used as training data to generate the classifier. This update occurs after a number of new false alarms have been added to the false alarm database.

It is obvious that many modifications and variations of the present invention are possible in light of the above teachings. It is therefore to be understood that within the scope of the appended claims, the invention may be practiced otherwise than as described.

What is claimed is:

1. A method of hostile fire detection and localization based on a weapons fire detection imaging sensor system having detection sensors to provide a respective video output of the detection sensor as a sensor output, and a processor to process said sensor outputs and compute hostile fire detection, the method comprising the steps of:

processing by the processor said provided respective video output for each detection sensor to process a method to determine detection in the respective detection sensor, said method to determine detection in the respective detection sensor comprising the steps of:

reading an output video frame of the provided video output and preprocessing said output video frame to differentiate signal from background, tracking the signal as differentiated over time, determining the location of peak signal intensity by analyzing one or more signal consistently differentiated, determining the time at which the signal starts and the time at which it stops by analyzing the location of peak signal per differentiated signal, extracting temporal profile of signal at peak spatial location and temporal profile of signal in neighborhood of peak spatial location per differentiated signal, measuring duration and shape features of said temporal profiles, comparing said measurements against known target measurements, and associating multiple signals and declaring detection in a selected sensor output;

comparing detections from multiple sensor outputs;

classifying signal against known threat signatures, wherein said classifying signal against known signatures comprises the steps of:

for each detection, classify the detection as either weapons fire or false alarm based on extracted signature features;

if the detection is classified as false alarm, then updating a false alarm database to reflect the recently determined false alarm; and if the detection is classified as weapon fire, then reclassifying the detection to determine the class of weapon fire, said reclassifying the detection to determine the class of weapon comprising the steps of:

analyzing a class containing known target signatures of a weapons fire class and a false alarm class derived from a database of false alarms to determine which features provide the greatest distinction between two classes, calculate the distance between the detection and the weapons fire class based on the features which provide the greatest distinction between the two classes, comparing the calculated distance to a threshold, if the distance threshold is exceeded, then detection is declared a false alarm, and the false alarm class is updated with the new false alarm, and if the calculated distance is within the distance threshold, the detection is declared as weapon fire;

declaring as a weapon fire event the associated image sensor detections which have been classified as a weapon fire; and outputting azimuth location, elevation location, weapon classification, and time of firing for each declared weapon fire event, wherein, the distinction, or distance, between the two classes, is called a distance metric, wherein a feature distance is calculated using the following formula, where $\mu_i$ and $\sigma_i$ are the mean and standard deviation value of a given feature for the $i^{th}$ class and abs is the absolute value:

$$\text{Feature Distance} = \frac{\text{abs}(\mu_1 - \mu_2)}{\sqrt{1/2(\sigma_1^2 + \sigma_2^2)}}.$$

2. The method of hostile fire detection and localization according to claim 1, wherein determining detection in the respective detection sensor includes independently determining a weapons fire detection per video output of the respective detection sensor as an imaging sensor detection, wherein a single weapons fire event may generate imaging sensor detections on multiple sensors.

3. The method of hostile fire detection and localization according to claim 1, wherein comparing detections from multiple sensor outputs includes the steps of:

analyzing imaging sensor detections across multiple sensors to determine if they were generated by a single hostile fire event, wherein detection locations, detection event time, and characteristics of detected signatures are used to determine whether multiple detections were generated by the single hostile fire event; and if the multiple imaging sensor detections are found to have been generated by a single hostile fire event, a single hostile fire detection is created.

4. The method of hostile fire detection and localization according to claim 1 wherein classifying signal against known threat signatures includes the steps of:

calculating features from temporal and intensity profiles of a hostile fire detection to classify the hostile fire detection as either of a weapon fire event or a false alarm; and subdividing a weapon fire event into at least anti-tank guided missile, recoilless rifle, and rocket propelled grenade weapon fire events.

5. The method of classifying a hostile fire detection and localization according to claim 1, wherein said extracting temporal profile of signal at peak spatial location and temporal profile of signal in neighborhood of peak spatial location per differentiated signal includes the steps of:

extracting the signal between the measured start and stop times; and extracting a pixel-based signal from pixels surrounding the pixel in which the peak signal was found, using the measured start and stop times.

6. The method of classifying a hostile fire detection and localization according to claim 1, wherein said measuring duration and shape features of said temporal profile includes analyzing the extracted signals for duration and shape characteristics.

7. The method of classifying a hostile fire detection and localization according to claim 1, wherein said comparing said measurements against known target measurements includes comparing the duration and shape characteristics of the extracted signals against known target characteristics.

8. The method of classifying a hostile fire detection and localization to claim 1, wherein said associating multiple signals and declaring detection in a selected sensor output includes the steps of:

if multiple signals are found to have characteristics corresponding to known targets, analyzing those signals to determine whether they were generated by the same weapon fire event; and for multiple signals generated by the same weapon fire event, a single detection is generated.

9. The method of classifying a hostile fire detection and localization according to claim 1, wherein the class of weapon fire can be chosen from the group consisting of guided missile, recoilless rifle, or rocket weapon fire.

10. A method of hostile fire detection and localization based on a weapons fire detection imaging sensor system having detection sensors to provide a respective video output of the detection sensor as a sensor output, and a processor to process said sensor outputs and compute hostile fire detection, the method comprising the steps of:

processing by the processor said provided respective video output for each detection sensor to process a method to determine detection in the respective detection sensor, said method to determine detection in the respective detection sensor comprising the steps of:

reading an output video frame of the provided video output and preprocessing said output video frame to differentiate signal from background, tracking the signal as differentiated over time, determining the location of peak signal intensity by analyzing one or more signal consistently differentiated, determining the time at which the signal starts and the time at which it stops by analyzing the location of peak signal per differentiated signal, extracting temporal profile of signal at peak spatial location and temporal profile of signal in neighborhood of peak spatial location per differentiated signal, measuring duration and shape features of said temporal profiles, comparing said measurements against known target measurements, and associating multiple signals and declaring detection in a selected sensor output;

comparing detections from multiple sensor outputs;

classifying signal against known threat signatures, wherein said classifying signal against known signatures comprises the steps of:

for each detection, classify the detection as either weapons fire or false alarm based on extracted signature features;

if the detection is classified as false alarm, then updating a false alarm database to reflect the recently determined false alarm; and if the detection is classified as weapon fire, then reclassifying the detection to determine the class of weapon fire, said reclassifying the detection to determine the class of weapon comprising the steps of:

analyzing a class containing known target signatures of a weapons fire class and a false alarm class derived from a database of false alarms to determine which features provide the greatest distinction between two classes, calculate the distance between the detection and the weapons fire class based on the features which provide the greatest distinction between the two classes, comparing the calculated distance to a threshold, if the distance threshold is exceeded, then detection is declared a false alarm, and the false alarm class is updated with the new false alarm, and if the calculated distance is within the distance threshold, the detection is declared as weapon fire;

declaring as a weapon fire event the associated image sensor detections which have been classified as a weapon fire; and outputting azimuth location, elevation location, weapon classification, and time of firing for each declared weapon fire event, wherein the distance between a detection and a class is calculated using the following formula, where n is the number of features used, $x_i$ is the value of the detected signal's $i^{th}$ feature, and $\mu_i$ and $\sigma_i$ are the mean and standard deviation value of the $i^{th}$ feature of the class:

$$\text{Detection Distance} = \sqrt{\sum_{i=1}^{n} \left(\frac{x_i - \mu_i}{\sigma_i}\right)^2}.$$

11. The method of classifying a hostile fire detection and localization according to claim 10, wherein a classifier which is used to classify detections as either weapons fire or false alarm is periodically updated using known target classes and a current false alarm class.

* * * * *